(12) United States Patent
Bacardit et al.

(10) Patent No.: US 6,675,695 B2
(45) Date of Patent: Jan. 13, 2004

(54) EMERGENCY BRAKING BRAKE BOOSTER COMPRISING SOUNDPROOFING MEANS

(75) Inventors: Joan Simon Bacardit, Barcelone (ES); Fernando Sacristan, Barcelona (ES); Bruno Berthomieu, Barcelona (ES)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 09/979,931

(22) PCT Filed: Jul. 12, 2001

(86) PCT No.: PCT/FR01/02255

§ 371 (c)(1),
(2), (4) Date: Nov. 16, 2001

(87) PCT Pub. No.: WO02/08038

PCT Pub. Date: Jan. 31, 2002

(65) Prior Publication Data

US 2003/0140777 A1 Jul. 31, 2003

(30) Foreign Application Priority Data

Jul. 25, 2000 (FR) ............................................ 00 09753

(51) Int. Cl.$^7$ ................................................ F15B 9/10
(52) U.S. Cl. ..................................... 91/369.3; 91/376 R
(58) Field of Search ............................ 91/369.2, 369.3, 91/376 R

(56) References Cited

U.S. PATENT DOCUMENTS 6,186,042 B1 * 2/2001 Levrai et al. .............. 91/369.2
6,553,888 B2 * 4/2003 Bacardit .................... 91/369.3

* cited by examiner

Primary Examiner—F. Daniel Lopez
(74) Attorney, Agent, or Firm—Leo H. McCormick, Jr.; Warren Comstock

(57) ABSTRACT

The invention provides a pneumatic servomotor for an assisted braking of a motor vehicle, of the type comprising a unidirectional clutch device, which includes a coaxial sleeve (58), sliding on a plunger (46), and axial-locking means, which are capable of locking said sleeve (58) in an end front axial position, in which it locks the piston (22) independently of the control rod (38), when an input force is applied at a given speed on the control rod (38) integral with the plunger (46), characterised in that the unidirectional clutch device comprises damping means, made of an elastomeric material and interposed between a stop-forming transverse intermediate face (59) of the plunger (46) and an opposite transverse face (76) of the sleeve (58), so as to permit, once the input force is released and when the locking means no longer lock the sleeve (58), the noiseless return of the sleeve (58) to its rear rest position.

5 Claims, 4 Drawing Sheets

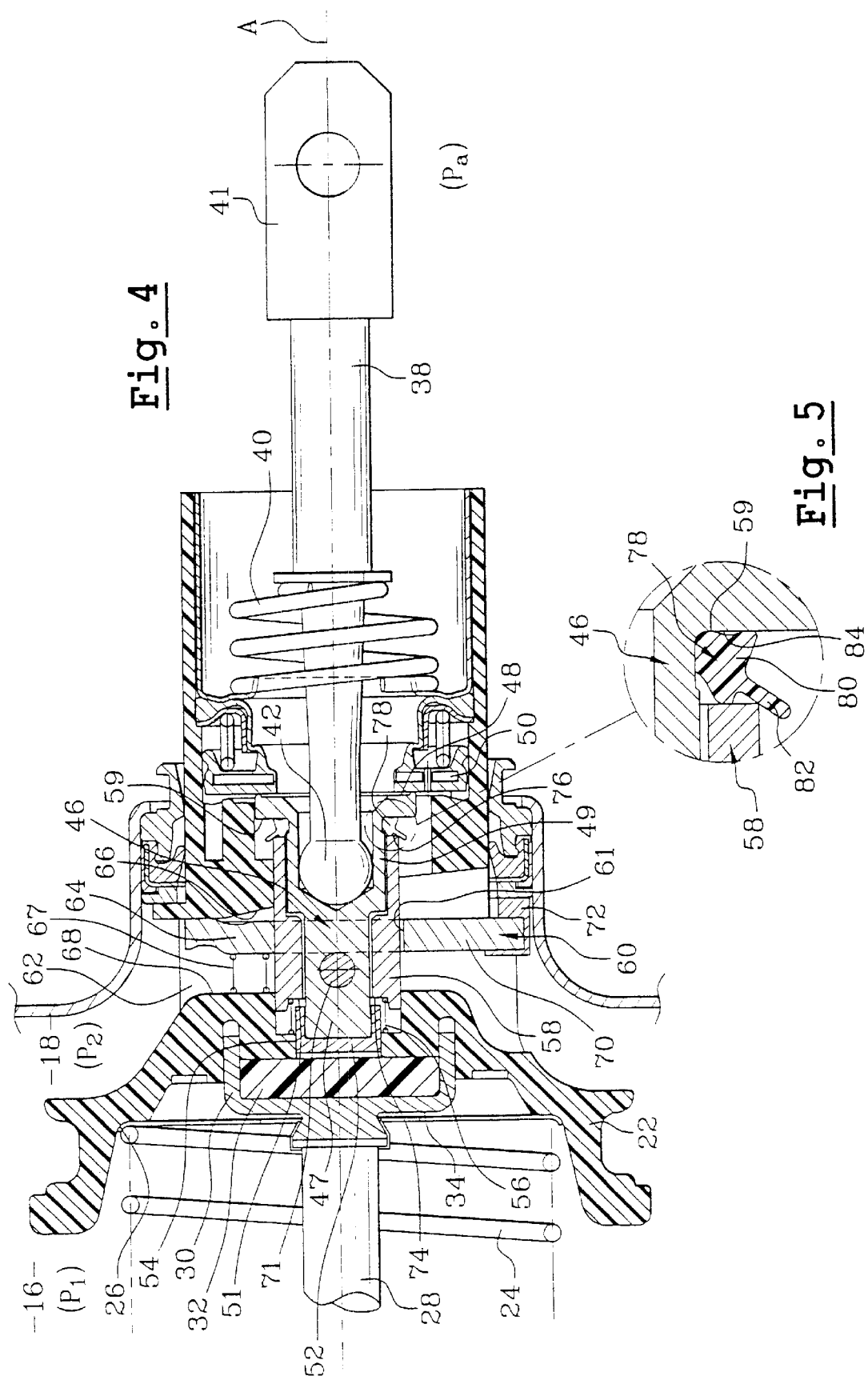

EMERGENCY BRAKING BRAKE BOOSTER COMPRISING SOUNDPROOFING MEANS

This invention relates to a pneumatic servomotor used for assisting in the braking of a motor vehicle.

More particularly, the present invention relates to a pneumatic servomotor for an assisted braking of a motor vehicle, of the type comprising a rigid casing, in which a transverse partition wall is movable, thus defining in an airtight manner a front chamber under a first engine negative pressure, and a rear chamber under a second pressure, varying between the engine negative pressure and the atmospheric pressure; of the type including a moving piston, integral with the moving partition wall and travelling with the latter, and a control rod, moving inside the piston, in a selective manner as a function of an axial input force, exerted in the forward direction against a return force applied to the rod by a return spring; of the type according to which the control rod is biased towards either an intermediate actuation position or an end actuation position, resulting from the applying of the input force at a determined high speed; of the type comprising a plunger, arranged at the front part of the control rod inside the piston, and a three-way valve, including at least an annular seat borne by a rear section of the plunger, and capable of varying the second pressure, prevailing within the rear chamber, particularly by connecting the front chamber with the rear chamber when the control rod is in the rest position, or by gradually connecting the rear chamber with the atmospheric pressure when the control rod is actuated; of the type in which, in the end actuation position of the control rod, a finger, which is slidingly fitted on the front end of the plunger, is biased by the plunger into contact with a reaction disk, integral with the moving piston, so as to transmit the reaction force of the moving piston to the plunger and to the control rod; and of the type comprising a unidirectional clutch device, which includes a coaxial sleeve, sliding on the plunger, and axial-locking means, which are capable of locking said sleeve in an end front axial position, in which a front end annular bearing surface of the sleeve locks the finger, independently of the plunger and of the control rod.

In a well-known manner, such a design is most suitable as regards safety, in the case of an emergency braking situation.

As a matter of fact, a conventional servomotor comprises neither a finger nor a unidirectional clutch device for the finger. Thus the plunger is likely to bias directly the reaction disk, integral with the rear face of the moving piston.

In a full-braking situation, in which case a maximum braking force is applied on the control rod, the actuation of the control rod causes the finger-forming plunger to be actuated, which fact results in the maximum opening of the three-way valve and, therefore, the rear chamber is subjected to the atmospheric pressure. Thus, the moving partition wall travels forward and the end of the plunger contacts the reaction disk, integral with the rear face of the moving piston.

Therefore, the force, which is applied onto the moving piston when the control rod reaches the end of its stroke, results from the assisting force, arising from the pressure difference between each side of the moving partition wall, and from the force exerted by the finger-forming plunger onto said moving piston. Besides, the driver feels the braking reaction force, which is transmitted from the moving piston to the plunger, through the reaction disk.

As a matter of fact, it has been established that quite a number of drivers, when confronted with an emergency braking situation, underestimated the risks actually incurred and, after having jammed the brakes on, would somewhat release the braking force at the very time when a considerable force should have been maintained in order to avoid an accident.

In the case of a full-braking situation, accompanied by the swift travel of the control rod, the plunger may touch the reaction disk and therefore give the driver the feeling of a maximum braking action even before the pressure difference between the front and rear chambers actually reaches its maximum value, which may lead the driver to release the braking force even though it should be maintained so as to profit by the maximum braking force.

A servomotor, like that of the above-described type, makes it possible to eliminate such a disadvantage.

As a matter of fact, since such a servomotor comprises a sleeve, which slides on the finger, when the axial-locking means fix the sleeve in an axial position, the finger is locked into contact with the reaction disk by means of the sleeve, which results in a maximum force being maintained on the rear face of the moving piston, even though the driver may have released the braking force in part.

Now, in such a servomotor, the sleeve is resiliently drawn back into contact with the plunger, through a spring, which is interposed between the moving piston and the sleeve.

Therefore, when the driver releases the braking force exerted on the brake pedal, the axial-locking means are released too, with the result that the sleeve is violently returned into abutment against a shoulder-forming face of the plunger, thus giving rise to a noise which is most unpleasant to the passengers.

In order to cope with said difficulty, the present invention provides sound-absorbing means for the return travel of the sleeve.

Therefore, it is the object of the present invention to provide a servomotor of the above-described type, characterised in that the unidirectional clutch device comprises damping means, made of an elastomeric material and interposed between a stop-forming transverse intermediate face of the plunger and an opposite transverse face of the sleeve, so as to permit, once the input force is released and when the locking means no longer lock the sleeve, the noiseless return of the sleeve to its rear rest position.

According to other features of this invention:
- the sleeve has a tubular shape, with an inner diameter corresponding to the diameter of a front section of the plunger, the opposite transverse face of the sleeve being formed by the annular rear face of the sleeve;
- the stop-forming intermediate face of the plunger consists of a transverse annular front face, borne by a shoulder-forming rear section of the plunger, whereas a rear face of said rear section bears the rear annular seat of the valve;
- the elastomeric damping means comprise a ring-type joint, which is fastened on the annular front face of the shoulder-forming section of the plunger;
- the ring-type joint comprises at least a rear annular section and a lip-forming truncated-cone-shaped front section, the taper of which is directed backwards, and which is intended to decelerate the sleeve in the course of its return to the rest position, before it actually bears against the rear annular section;
- a rear face of the annular section of the ring-type joint is stuck to the annular front face of the shoulder-forming section of the plunger;
- the axial-locking means for the sleeve comprise a substantially annular key, which surrounds the sleeve with a given clearance and which is capable of being driven by the moving piston, when the input force is applied at the determined speed, so as to rock about a generally transverse axis, in such a way that it may cooperate with the periphery of the sleeve and stop the latter;

the key comprises at least one branch, which is substantially radially directed and traversed by the sleeve, and having locking means intended to cooperate with the periphery of the sleeve so as to lock it;

the key is received within a cavity, traversing the piston perpendicularly to the axis of the latter, and in which it is capable of rocking to take its locking position for the sleeve, the key being resiliently returned by a compression spring, arranged between the front transverse wall of the cavity and a front face of an upper part of the branch, so as to resume its rest position, in which its branch rests, by its upper part, on the rear transverse wall of the cavity while, in the opposite direction, the lower part of the branch bears on a support integral with the casing of the servomotor.

Other features and advantages of the present invention will be apparent from the following detailed description, by way of example and by no means as a limitation, when taken in conjunction with the accompanying drawings, in which:

FIG. 4 is a detail axial sectional view of the servomotor of FIG. 2, showing the return and the damping of the sleeve; and FIG. 5 is a detail sectional view of the joint.

In the following description, the same reference numerals will designate the same elements, or elements having similar functions.

As a rule, the terms "front", "rear", "upper" and "lower" refer respectively to elements or positions facing leftward, rightward, upward or downward in FIGS. 1 through 4.

Figure 1:
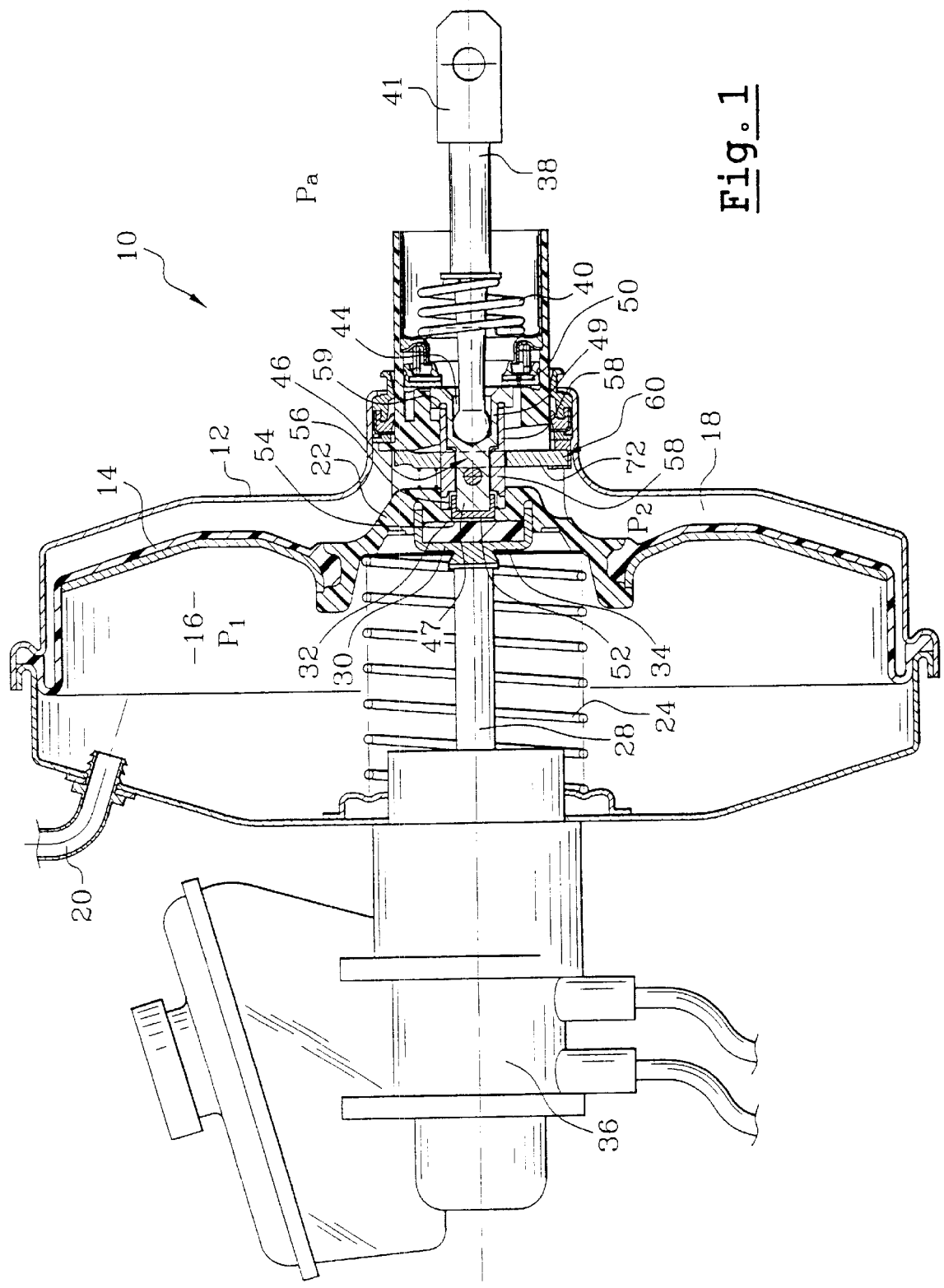
FIG. 1 is an axial sectional view, showing a pneumatic servomotor for an assisted braking according to the prior art.

FIG. 1 illustrates a pneumatic servomotor 10 for an assisted braking of a motor vehicle.

In a well-known manner, the pneumatic servomotor 10 comprises a rigid casing 12, in which a transverse partition wall 14 is movably mounted, so as to define therein, in an airtight manner, a front chamber 16 under a first pressure "$P_1$", the value of which is equal to the negative pressure value of the vehicle engine, and a rear chamber 18 under a second pressure "$P_2$". Said second pressure "$P_2$" may vary between the engine negative pressure value "$P_1$" and the atmospheric pressure "$P_a$", as will be further explained hereunder.

The front chamber 16 is supplied with the pressure "$P_1$" through a negative-pressure pipe 20, connected to a vacuum source of the vehicle, for instance a negative pressure prevailing in an inlet manifold (not shown) of a vehicle engine.

The pneumatic servomotor 10 comprises a moving piston 22, integral with the moving partition wall 14. Inside the casing 12, the moving partition wall 14 is resiliently returned by a return spring 24, which rests on the casing 12 and on a front face 26 of the moving piston 22. The front face 26 of the moving piston 22 carries a reaction cup 30, in which a reaction disk 32, made of an elastomeric material, is accommodated in a manner to be described below. The front face 34 of the reaction cup 30 is integral with an actuating rod 28, which therefore travels with the moving piston 22, for the actuation of a hydraulic-brake master cylinder 36 of the vehicle.

A control rod 38, e.g. connected to the brake pedal of the vehicle through a coupling sleeve 41, arranged at its free rear end, may selectively travel within the moving piston 22, as a function of an input axial force, applied to the control rod 38 in the forward direction. The actuation force is exerted against a return force, applied to the rod 38 by a return spring 40, arranged between the moving piston 22 and the control rod 38.

The front end of the control rod 38 is shaped into a toggle 42, received in a housing 44 having a complementary shape and provided in a substantially cylindrical plunger 46, which is slidably mounted in the moving piston 22. More especially, the housing 44 is provided in a shoulder-forming rear section 49 of the plunger 46.

A rear annular seat 48 of the plunger 46, located at the end part of the rear section 49 of the plunger 46, belongs to a three-way valve 50, capable of varying the second pressure "$P_2$", prevailing in the rear chamber 18, more particularly by connecting the front chamber 16 with the rear chamber 18 when the control rod 38 is in the rest position, or by gradually subjecting the rear chamber 18 to the atmospheric pressure "$P_a$" when the control rod 38 is actuated.

Since the mode of operation of the three-way valve 50 is known from the state of the art, it will not be further described herein.

In a well-known manner, a finger 52 is slidably fitted both on the front end of a front section 47 of the plunger 46, in the opposite direction to the rear section 49, and inside a bore 54 provided in the moving piston 22 and opening facing the reaction cup 30. Therefore, the finger 52 is capable of being biased by the plunger 46 so as to bias, in turn, the reaction disk 32 and compress it, and thus the reaction force of the moving piston 22 is transferred onto the plunger 46 and, in consequence, onto the control rod 38, in an end-of-stroke actuating position of the control rod 38.

As is well known too, the servomotor 10 includes a unidirectional clutch device, comprising, on the one hand, a coaxial sleeve 58 and, on the other hand, means intended for the axial locking of the sleeve 58.

The sleeve 58 slides on the front section 47 of the plunger 46 and is resiliently returned through a spring 56, which is arranged between the piston 22 and the sleeve 58, into contact with a stop-forming intermediate face of the plunger 46 and, more particularly, into contact with a transverse annular front face 59 of the shoulder-forming rear section 49 of the plunger 46.

As for the axial-locking means of the sleeve 58, when an input force is applied in the forward direction, in accordance with a full stroke of the control rod 38, especially at a determined speed of the latter, these means are capable of stopping axially the sliding motion of the sleeve 58 on the front section 47 of the plunger 46, as a consequence of which the finger 52 is locked in an end front position, in which it biases the reaction disk 32.

If the driver releases the force exerted on the control rod 38 too soon, the sleeve 58 is locked by the axial-locking means in an end front axial position, in which it locks the finger 52, independently of the plunger 46 and the control rod 38, which means that a maximum braking force is maintained as long as the return of the control rod 38 does not cause the three-way valve 50 to reopen and, consequently, the piston 22 to move backwards in the return direction.

The mode of operation of the unidirectional clutch device will now be described more specifically with reference to the following figures showing a servomotor 10, forming the subject of this invention and operating in accordance with the same principle.

In the design illustrated in FIG. 1, the unidirectional clutch device has a disadvantage in that it is not fitted with damping means for the sleeve 58.

As a matter of fact, when the driver releases the force exerted on the control rod 38; entirely and suddenly, the axial-locking means of the sleeve 58 are instantaneously unlocked and they release the sleeve 58 from its end front position. In such a case, the sleeve 58 is abruptly returned by the return spring 56 into contact with the transverse annular front face 59 of the rear section 49 of the plunger 46, which gives rise to a noise grating on the passengers' ears, when the vehicle is fitted with such a servomotor 10.

Figure 2:
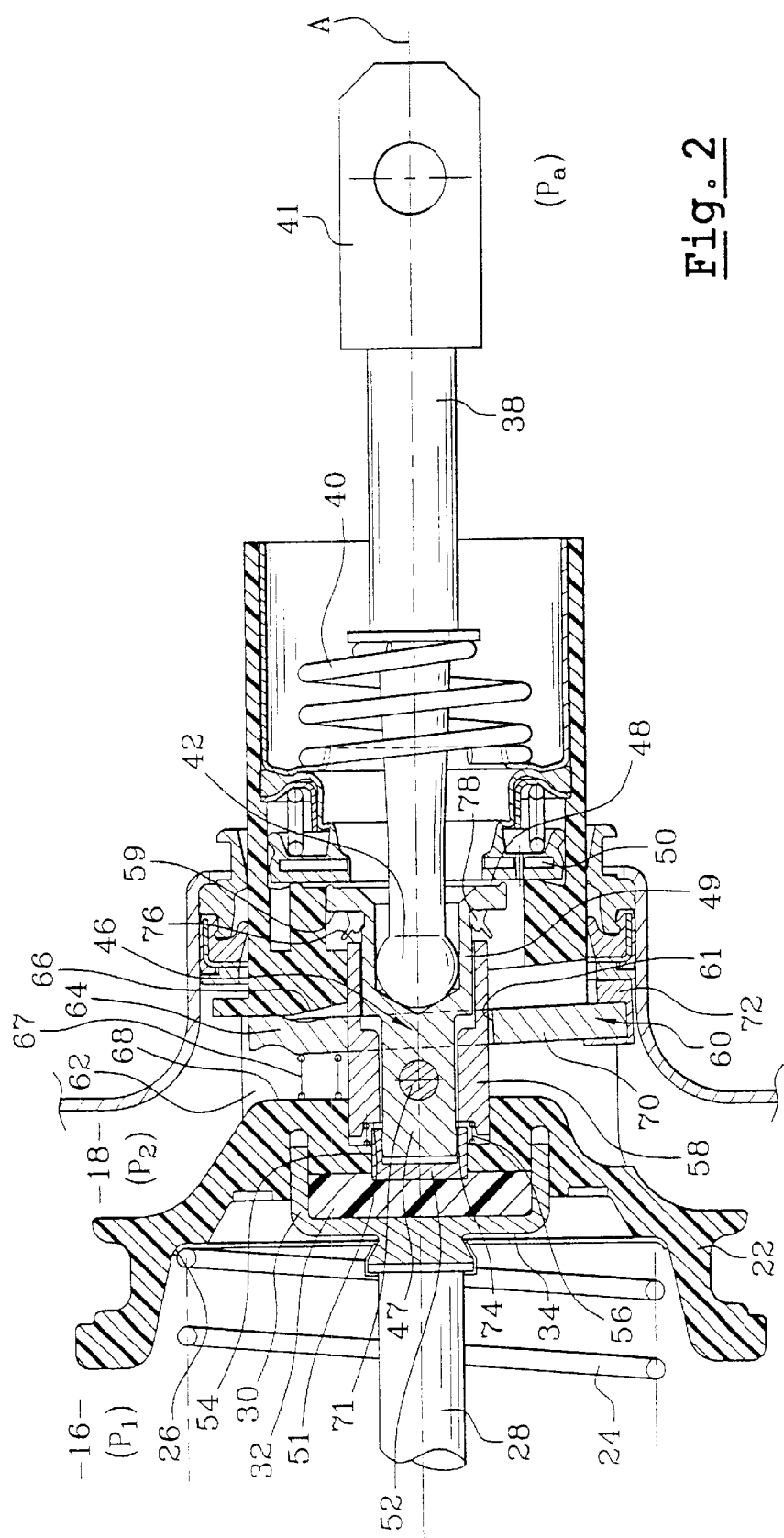
FIG. 2 is a detail axial sectional view, showing a servomotor for an assisted braking according to the present invention, the axial-locking means being represented in the rest position.
Figure 3:
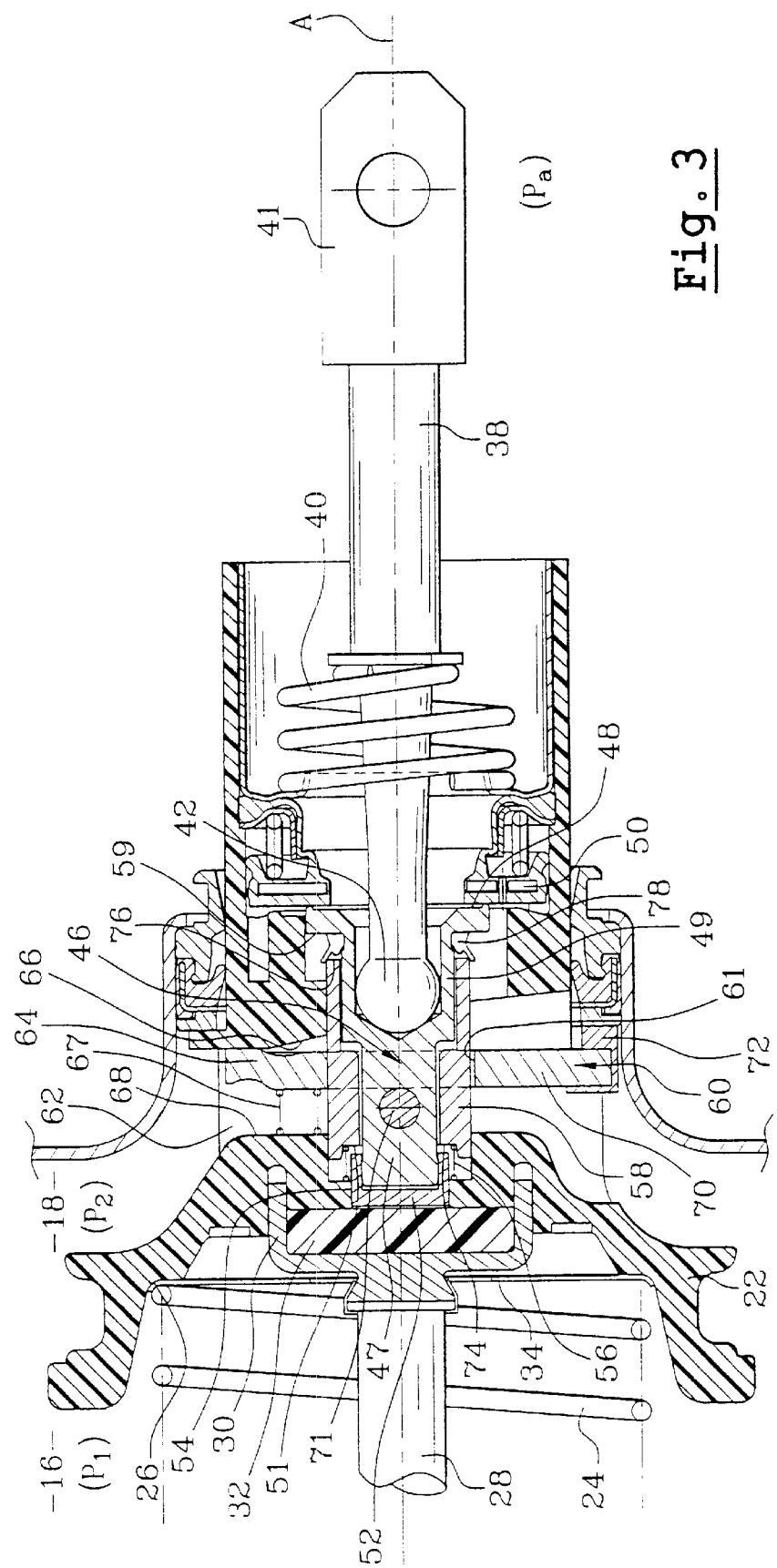
FIG. 3 is a detail axial sectional view of the servomotor according to FIG. 2, the axial-locking means being shown in the locking position of the sleeve.

In order to cope with this difficulty, the invention provides a servomotor 10 of the type shown in FIGS. 2 through 4.

In a well-known manner, and as illustrated in FIGS. 2 through 4, this servomotor 10 comprises a unidirectional clutch device which may comprise, by way of example and by no means as a limitation imposed on the scope of this invention, on the one hand, the coaxial sleeve 0.58, which slides on the front section 47 of the plunger 46 and which is resiliently returned by means of the spring 56 and, on the other hand, axial-locking means, which consist of a substantially annular key 60, surrounding the sleeve 58 with a radial clearance. With this object in view, the spring 56 is interposed between the piston 22 and the sleeve 58, in contact with a shoulder-forming front face 51 of the sleeve 58. The sleeve 58 has a tubular shape and, so as to enable it to slide, its inner diameter corresponds to the diameter of the front section 47 of the plunger 46. The rear section 49 of the plunger bears, at its rear end part, the rear annular seat 50 of the three-way valve.

More particularly, when the servomotor 10 is in the assembled state, the sleeve 58 traverses a circular opening 61, situated in a substantially radially-directed branch of the key 60. The edges of the opening 61 will bear on the sleeve 58 so as to lock it.

The key 60 is received within a cavity 62, traversing the piston 22 perpendicularly to its axis "A". An upper part 64 of the radial branch of the key 60 is resiliently biased into abutment against a rear wall 66 of the cavity 62, by means of a compression spring 67 arranged between a transverse front wall 68 of the cavity 62 and a front face of the upper part 64 of the radial branch of the key 60.

In the rest position, a lower part 70 of the radial branch of the key 60 bears on a support 72 provided on the casing 12 of the servomotor 10. A transverse pin 71, extending through openings cut in the sleeve 58 and the plunger 46, bears, in the rest position of the control rod 38, on a front face of the key 60 so as to define the rest position of the plunger 46.

In that way, when an input force is applied in the forward direction, in accordance with a full stroke of the control rod 38, especially at a determined speed of the latter, the upper part 64 of the key 60 is driven by the piston 22, whereas its lower part 70 separates from the support 72. It results in that the key 60 rocks about a generally transverse axis anticlockwise so as to cooperate with the periphery of the sleeve 58.

As long as such travel of the control rod 38 is continuing in the forward direction and as long as the rod drives the sleeve 58, the force, exerted on the control rod 38, is enough to prevent the complete locking of the sleeve 58, since such force is higher than that applied by the spring 67 onto the key 60.

On the other hand, if the driver releases the force exerted on the control rod 38 too soon, the sleeve 58 is locked by the key 60 in an end front axial position, in which an annular bearing surface 74 at the front end part of the sleeve 58 locks the finger 52, independently of the plunger 46 and the control rod 38, which means that a maximum braking force can be maintained as long as the return motion of the control rod 38 does not cause the three-way valve 50 to reopen and, as a result, the front-to-rear travel of the piston 22.

According to this invention, the unidirectional clutch device comprises elastomeric damping means, which are interposed between the annular front face 59 of the rear section 49 of the plunger 46 and an opposite transverse face of the sleeve 58, so as to permit, once the input force is released and when the locking means have unlocked the sleeve 58, a silent return of the sleeve 58 to its rear rest position.

For this purpose, the transverse face of the sleeve 58, which is located opposite the annular front face 59 of the rear section 49 of the plunger 46, consists of an annular rear face 76 of the sleeve 58.

More especially, the elastomeric damping means comprise a ring-type joint 78, which is fastened on the annular front face 59 of the shoulder-forming rear section 49 of the plunger 46.

As shown in FIG. 5, the ring-type joint 78 comprises at least a rear annular section 80 and a lip-forming truncated-cone-shaped front section 82, the taper of which is directed backwards, and which is intended to decelerate the sleeve 58 in the course of its return to the rest position, before it actually bears against the rear annular section 80. A rear face 84 of the rear annular section 80 of the ring-type joint is stuck to the annular front face 59 of the shoulder-forming rear section 49 of the plunger 46.

The mode of operation of the elastomeric damping means is described hereunder more circumstantially, with reference to FIGS. 2 through 4.

In the design of the servomotor 10, as illustrated in FIG. 2, the latter operates in a super assisting mode, i.e. the sleeve 58 has been moved in the forward direction by the plunger 46, in such a way that the finger 32 biases the reaction disk 32 and then the actuating force has been somewhat reduced, with the result that the key 60 has fixed the sleeve 58 in position. Under such circumstances, the sleeve 58 does not bias the ring-type joint 78.

Afterwards, when the force is released so as to cause the three-way valve 50 to open and the sleeve 58 to be unlocked, as shown in FIG. 3, the sleeve 58 moves backwards, and it is received within the truncated-cone-shaped front section 82 of the joint 78, so as to be decelerated.

Finally, when the sleeve 58 has resumed its rest position, as illustrated in FIG. 4, its annular rear face abuts against the rear annular section 80 of the ring-type joint 78, thus ensuring the silent return of the sleeve 58.

Therefore, in an advantageous manner, the servomotor according to the present invention, which is fitted with efficient sound-absorbing means, gives the benefit of a maximum braking force in emergency braking situations.

What is claimed is:

1. A pneumatic servomotor for an assisted braking of a motor vehicle having a rigid casing with a transverse partition wall located therein that is movable in an airtight manner between a front chamber and a rear chamber, said front chamber being connected to receive a first pressure corresponding to an engine negative pressure while said rear chamber is selectively connected to said first pressure and a second pressure corresponding to atmospheric pressure; a piston integral with said partition wall that moves with said partition wall, and a control rod that selective moves inside said piston as a function of an axial input force, said control rod exerting an input force in the forward direction against a return force applied to said control rod by a return spring; said control rod being biased towards either an intermediate actuation position or an end actuation position as a function of a rate of speed at which an input force is applied to said control rod; a plunger that is connected to said control rod with a front part located inside said piston, and a three-way valve, including at least an annular seat borne by a rear section of said plunger, said three-way valve varying the second pressure within said rear chamber by connecting said front chamber with said rear chamber when said control rod is in a rest position and gradually connecting said rear chamber with said second pressure in response to an actuation force being applied to said control rod; said plunger having a finger that is slidingly fitted on a front end thereof, said finger when said control rod is in said end actuation position being biased by the plunger into contact with a reaction disk that is integral with said piston, said finger transmitting a reaction force corresponding to an operational force that urges the wall toward the front chamber to the plunger and to the control rod; and a unidirectional clutch device with a coaxial sleeve that slides on said plunger, and axial-locking means that locks said sleeve in an end front axial position such that a front end annular bearing surface of said sleeve locks the finger, independently of said plunger and of said control rod; characterised in that said unidirectional clutch device includes damping means, said damping means being made of an elastomeric material and interposed between a stop-forming transverse intermediate face of said plunger defined by transverse annular front face carried by a shoulder-forming rear section of said plunger and an opposite transverse face of said sleeve, said damping means permitting a noiseless return of said sleeve to its rear rest position once said input force terminates and said locking means no longer lock said sleeve, said sleeve having a tubular shape, with an inner diameter that corresponds to a diameter of a front section of said plunger, and in that said opposite transverse face of said sleeve is formed by said annular rear face of said sleeve whereas a rear face of said rear section bears said rear annular seat of said three-way valve, said elastomeric damping means comprise a ring-type joint that is retained on said annular front face of said shoulder-forming rear section of said plunger, said ring-type joint at least having a rear annular section and a lip-forming truncated-cone-shaped front section with a taper of said truncated-cone-shaped front section being directed backwards therefrom that engages said sleeve to decelerate the speed of said sleeve in returning to a position of rest prior to said sleeve actually bearing against said rear annular section.

2. The pneumatic servomotor according to claim 1 characterised in that said ring-type joint has a rear face that is retained on said annular front face of said shoulder-forming section of said plunger.

3. The pneumatic servomotor according to claim 1, characterised in that said axial-locking means for said sleeve comprise a substantially annular key that surrounds said sleeve with a given clearance and is driven by said piston when an input force is applied at a determined speed to rock about a generally transverse axis in such a way that said key co-operates with a periphery of said sleeve and stop movement of said sleeve.

4. The pneumatic servomotor according to claim 3, characterised in that said key has at least one branch that is substantially radially directed and traversed by said sleeve and has locking means that co-operate with a periphery of said sleeve to prevent independent movement of said sleeve.

5. The pneumatic servomotor according to claim 4, characterised in that said key is located within a cavity to perpendicularly traverse the axis of said piston, said key being capable of rocking into a locking position for said sleeve, and in that said key is resiliently returned by a compression spring located between a front transverse wall of said cavity and a front face of an upper part of said one branch, said key being positioned in a rest position whereby an upper part of said branch rests on a rear transverse wall of said cavity while and on movement of said key from said rest position a lower part of said branch bears on a support that is integral with said casing of said servomotor.

* * * * *